United States Patent
Herold et al.

(10) Patent No.: US 8,813,716 B2
(45) Date of Patent: Aug. 26, 2014

(54) PRE-COMBUSTION CHAMBER TIP

(75) Inventors: Hendrik Herold, Kiel (DE); Ulrich Holst, Altenholz (DE); Frank Witt, Bordesholm (DE); Eike Joachim Sixel, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 560 days.

(21) Appl. No.: 13/166,112

(22) Filed: Jun. 22, 2011

(65) Prior Publication Data
US 2012/0325179 A1    Dec. 27, 2012

(51) Int. Cl.
| | |
|---|---|
| F02F 1/00 | (2006.01) |
| F02B 19/16 | (2006.01) |
| F02B 19/18 | (2006.01) |
| F02B 19/00 | (2006.01) |
| F02B 19/10 | (2006.01) |
| F01P 3/16 | (2006.01) |

(52) U.S. Cl.
CPC ............. *F02B 19/00* (2013.01); *F02B 19/1004* (2013.01); *F02B 19/1009* (2013.01); *F02B 19/16* (2013.01); *F02B 19/18* (2013.01); *F01P 3/16* (2013.01)
USPC ............................ 123/254; 123/285; 123/286

(58) Field of Classification Search
CPC .. F02B 19/00; F02B 19/1004; F02B 19/1009; F02B 19/18; F02B 19/16; F01P 3/16
USPC .................... 137/339, 334; 123/41.31, 41.32, 123/41.82 R, 253–293
See application file for complete search history.

(56) References Cited

U.S. PATENT DOCUMENTS

| | | | | |
|---|---|---|---|---|
| 2,148,505 A | * | 2/1939 | Rosen ........................... | 123/286 |
| 2,322,606 A | * | 6/1943 | Ward ............................. | 123/261 |
| 2,716,970 A | * | 9/1955 | King et al. .................. | 123/41.73 |
| 2,739,579 A | * | 3/1956 | Ware et al. ................. | 123/41.31 |
| 3,769,948 A | * | 11/1973 | Feichtinger et al. ....... | 123/41.31 |
| 4,426,966 A | * | 1/1984 | Huther et al. ................. | 123/286 |
| 5,024,193 A | * | 6/1991 | Graze, Jr. ...................... | 123/259 |
| 5,222,993 A | * | 6/1993 | Crane ........................... | 123/256 |
| 5,533,476 A | * | 7/1996 | Anderson ..................... | 123/267 |
| 5,662,082 A | * | 9/1997 | Black et al. ................... | 123/254 |
| 5,947,076 A | * | 9/1999 | Srinivasan et al. ........... | 123/267 |

(Continued)

FOREIGN PATENT DOCUMENTS

| | | |
|---|---|---|
| DE | 3622142 | 2/1988 |
| EP | 1128034 | 8/2001 |
| EP | 1 091 104 B1 | 6/2005 |
| WO | 2010074224 | 7/2010 |

*Primary Examiner* — Hieu T Vo
*Assistant Examiner* — Sherman Manley
(74) *Attorney, Agent, or Firm* — Finnegan, Henderson, Farabow, Garrett & Dunner LLP

(57) ABSTRACT

A pre-combustion chamber tip for an internal combustion engine having a first body portion with a pre-combustion chamber located within, the first body portion having a terminal end with a plurality of orifices configured to direct expanding gases out of the pre-combustion chamber and a second body portion attached to the first body portion, the second body portion having an exterior surface, a cooling fluid opening formed in the exterior surface, a cooling fluid passage in fluid communication with the cooling fluid opening, and a ridge associated with the cooling fluid opening, the ridge extending from the exterior surface and configured to divert cooling fluid flow into the cooling fluid opening and cooling fluid passage.

17 Claims, 4 Drawing Sheets

(56) References Cited

U.S. PATENT DOCUMENTS

| | | | |
|---|---|---|---|
| 6,019,081 A * | 2/2000 | Divecha et al. | 123/254 |
| 6,575,192 B1 * | 6/2003 | Shaffer | 137/514.5 |
| 6,854,439 B2 * | 2/2005 | Regueiro | 123/263 |
| 6,928,964 B2 * | 8/2005 | Obermayer et al. | 123/41.82 R |
| 7,950,364 B2 * | 5/2011 | Nerheim | 123/259 |
| 8,074,620 B2 * | 12/2011 | Filipek et al. | 123/266 |
| 2010/0132660 A1 * | 6/2010 | Nerheim | 123/260 |
| 2010/0146954 A1 * | 6/2010 | Sloss et al. | 60/320 |
| 2011/0146618 A1 * | 6/2011 | LaPointe et al. | 123/266 |
| 2013/0139784 A1 * | 6/2013 | Pierz | 123/254 |
| 2013/0228231 A1 * | 9/2013 | Nagel et al. | 137/334 |

\* cited by examiner

PRE-COMBUSTION CHAMBER TIP

TECHNICAL FIELD

The present disclosure relates to a pre-combustion chamber assembly for an internal combustion engine. More specifically, the present disclosure relates to a pre-combustion chamber tip with one or more cooling passages.

BACKGROUND

It is known to use a pre-combustion chamber in some internal combustion engine applications, such as gaseous fuel applications. Typically, a pre-combustion chamber is a relatively small gas accumulating chamber located in the engine cylinder head. The pre-combustion chamber is in fluid communication with the main combustion chamber of the engine via a number of small orifices. During operation, a spark plug ignites gaseous fuel within the pre-combustion chamber (as opposed to igniting the gaseous fuel in the main combustion chamber). Ignition of the gaseous fuel in the pre-combustion chamber creates a front of burning fuel which is jetted or otherwise advanced through the orifices and into the main combustion chamber thereby igniting the gaseous fuel therein.

The temperature in the pre-combustion chamber is extremely hot, which is detrimental to the life of the sparkplug and the pre-combustion chamber tip. To reduce temperatures of some of the pre-combustion chamber components, it is known to utilize a cooled pre-combustion chamber assembly.

EP 1 091 104 B1 discloses a cooled pre-combustion chamber assembly that has first, second and third body portions. The pre-combustion chamber has a sparkplug receiving bore with a threaded bore portion for mounting the spark plug and sparkplug cooling passageway that is adapted to pass cooling fluid flow in close proximity relative to the threaded bore portion to cool the spark plug.

While the assembly disclosed in the '104 patent may be suitable in some applications, in other applications, the assembly may provide sufficient cooling fluid flow to optimally cool the pre-combustion chamber components.

SUMMARY OF THE DISCLOSURE

In one aspect, the present disclosure is directed to a pre-combustion chamber tip for an internal combustion engine including a first body portion having a pre-combustion chamber located within, the first body portion having a terminal end with a plurality of orifices configured to direct expanding gases out of the pre-combustion chamber and second body portion attached to the first body portion, the second body portion having an exterior surface, a cooling fluid opening formed in the exterior surface, a cooling fluid passage in fluid communication with the cooling fluid opening, and a ridge associated with the cooling fluid opening, the ridge extending from the exterior surface and configured to divert cooling fluid flow into the cooling fluid opening and cooling fluid passage.

In another aspect, the present disclosure is directed to an internal combustion engine having an engine block with at least one cylinder; a cylinder head engaged with the engine block to cover the cylinder and define a main combustion chamber, the cylinder head having a cylinder head cooling fluid passage and a pre-combustion chamber assembly mounted in the cylinder head. The pre-combustion chamber assembly includes a first body portion having a pre-combustion chamber located within, the first body portion having a terminal end extending into the main combustion chamber and including a plurality of orifices configured to direct expanding gases from pre-combustion chamber into the main combustion chamber; and a second body portion attached to the first body portion, the second body portion having an exterior surface, a cooling fluid opening formed in the exterior surface, a cooling fluid passage in fluid communication with the cooling fluid opening, and a ridge associated with the cooling fluid opening, the ridge extending from the exterior surface and configured to divert cooling fluid flow from the cylinder head cooling fluid passage into the cooling fluid opening and cooling fluid passage.

In some embodiments of the pre-combustion chamber tip, the ridge may form an upper edge of the cooling fluid opening or the ridge may include a concave, curved lower surface. In addition, in some embodiments, the cooling fluid opening may have a first side edge and a second side edge, and the ridge may extend continuously from outside the first side edge to outside the second side edge. Furthermore, in some embodiments, the pre-combustion chamber tip may have a generally cylindrical exterior surface and include four, spaced apart cooling fluid openings and four ridges, each ridge associated with a corresponding cooling fluid opening.

Various embodiments of the present disclosure may contain only a subset of the elements and advantages set forth. No one advantage is critical to the embodiments. Any claimed embodiment may be technically combined with any other claimed embodiment(s).

DETAILED DESCRIPTION

Figure 1:
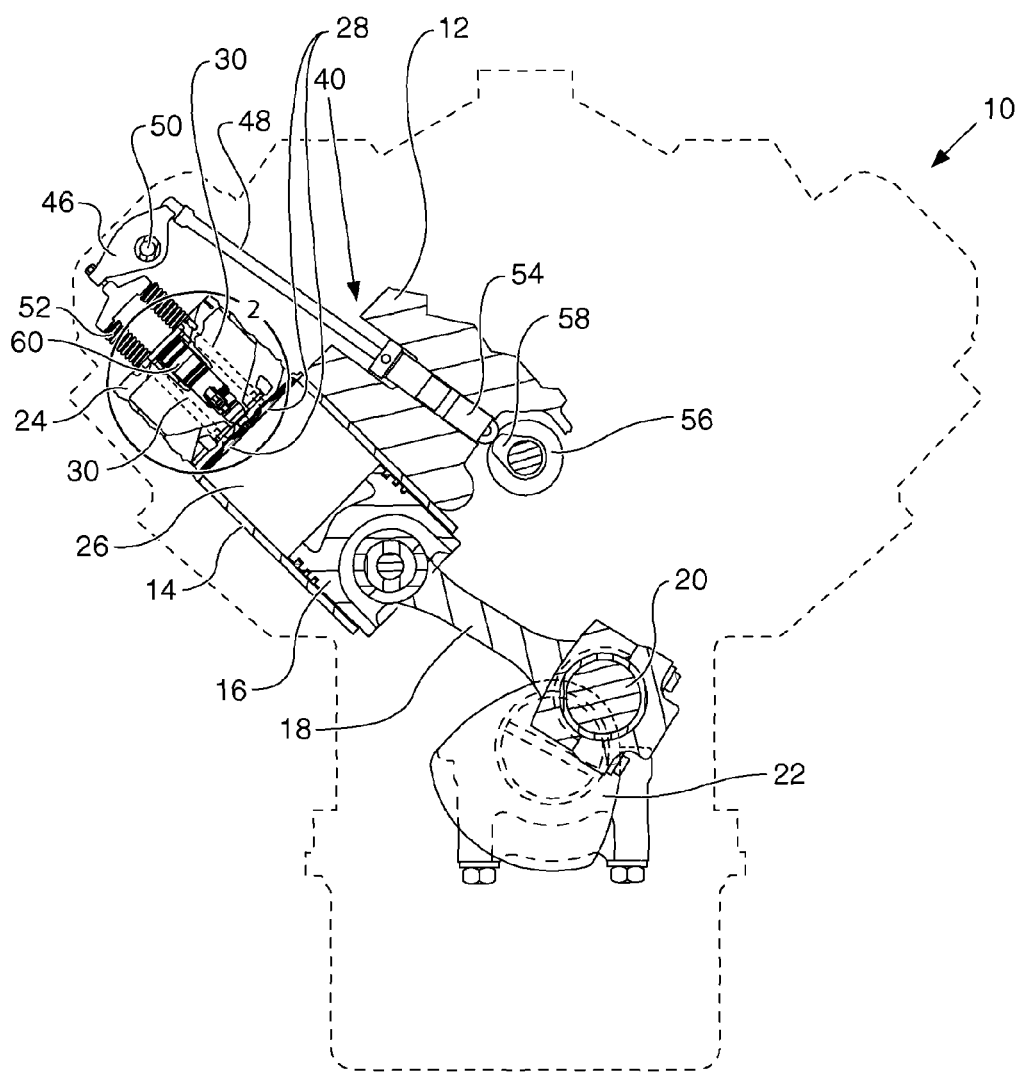
FIG. 1 is a diagrammatic cross-sectional view of an embodiment of an internal combustion engine with a pre-combustion chamber assembly of the present disclosure shown installed in a cylinder head of the engine.

Referring now to the drawings, an exemplary embodiment of an engine 10 is illustrated in FIG. 1. The engine 10 may include features not shown, such as fuel systems, air systems, cooling systems, peripheries, drivetrain components, turbochargers, etc. For the purposes of the present disclosure, engine 10 is considered a four-stroke gaseous fueled engine. One skilled in the art will recognize, however, that engine 10 may be any type of engine (internal combustion, turbine, gas, diesel, gaseous fuel, natural gas, propane, etc.) that would utilize a pre-combustion chamber. Furthermore, the engine 10 may be of any size, with any number of cylinders, and in any configuration ("V," in-line, radial, etc.). The engine 10 may be used to power any machine or other device, including locomotive applications, on-highway trucks or vehicles, off-highway trucks or machines, earth moving equipment, generators, aerospace applications, marine applications, pumps, stationary equipment, or other engine powered applications.

The engine 10 includes an engine block 12 having a plurality of cylinders 14 (one of which is illustrated in FIG. 1). A piston 16 is slidably disposed within the cylinder 14 to reciprocate between a top-dead-center position and a bottom-dead-center position. A connecting rod 18 connects the piston 16 to an eccentric crankpin 20 of a crankshaft 22 such that reciprocating motion of the piston results in rotation of the crankshaft 22.

The engine 10 also includes a cylinder head 24 engaged with the engine block 12 to cover the cylinder 14 and define a main combustion chamber 26. The cylinder head 24 defines intake and exhaust openings 28 that allow intake gases into the main combustion chamber 26 and exhaust gases out of the combustion chamber, respectively. The engine valves 30 are positioned to selectively open and close the openings. Each cylinder 14 may include multiple intake and exhaust openings 28. The cylinder head also defines a first cooling fluid passage 32 and a second cooling fluid passage 34.

The engine 10 may include a series of valve actuation assemblies 40 (one of which is illustrated in FIG. 1). Multiple valve actuation assemblies 40 may be provided per cylinder 14. For example, one valve actuation assembly may be used to open and close the intake valves and another valve actuation assembly may be provided to open and close the exhaust valves.

The valve actuation assembly 40 includes a rocker arm 46. The rocker arm 46 may be pivotally mounted in the cylinder head 24 and attach to the engine valves 30 at one end and attach to a push rod 48 at the other end. Oscillation of rocker arm 46 about its pivot point 50 causes the valves 30 to move between an open position and a close position. The valve actuation assembly 40 may also include valve springs 52 that bias the valves 30 toward the closed position (i.e. closing the intake and exhaust openings 28).

The other end of the push rod 48 engages a lifter 54 which engages a camshaft 56. The camshaft 56 operatively engages the crankshaft 22. The camshaft 56 may be connected with crankshaft 22 in any manner readily apparent to one skilled in the art where rotation of the crankshaft 22 results in rotation of the camshaft 56. For example, camshaft 56 may be connected to crankshaft 22 through a gear train (not shown).

As shown in FIG. 1, a first cam lobe 58 is disposed on the camshaft 56 to engage the lifter 54. One skilled in the art will recognize that the camshaft 56 may include additional cam lobes to engage with other lifters in order to actuate additional engine valves.

The engine 10 also includes a pre-combustion chamber assembly 60, which is positioned within the cylinder head 24 between the valves 30. The pre-combustion chamber assembly 60 may be configured in a variety of ways. Any assembly capable of being positioned in the cylinder head 24 to support a combustion event outside of the main combustion chamber 26, and direct the combustion into the main combustion chamber 26 may be used.

Figure 2:
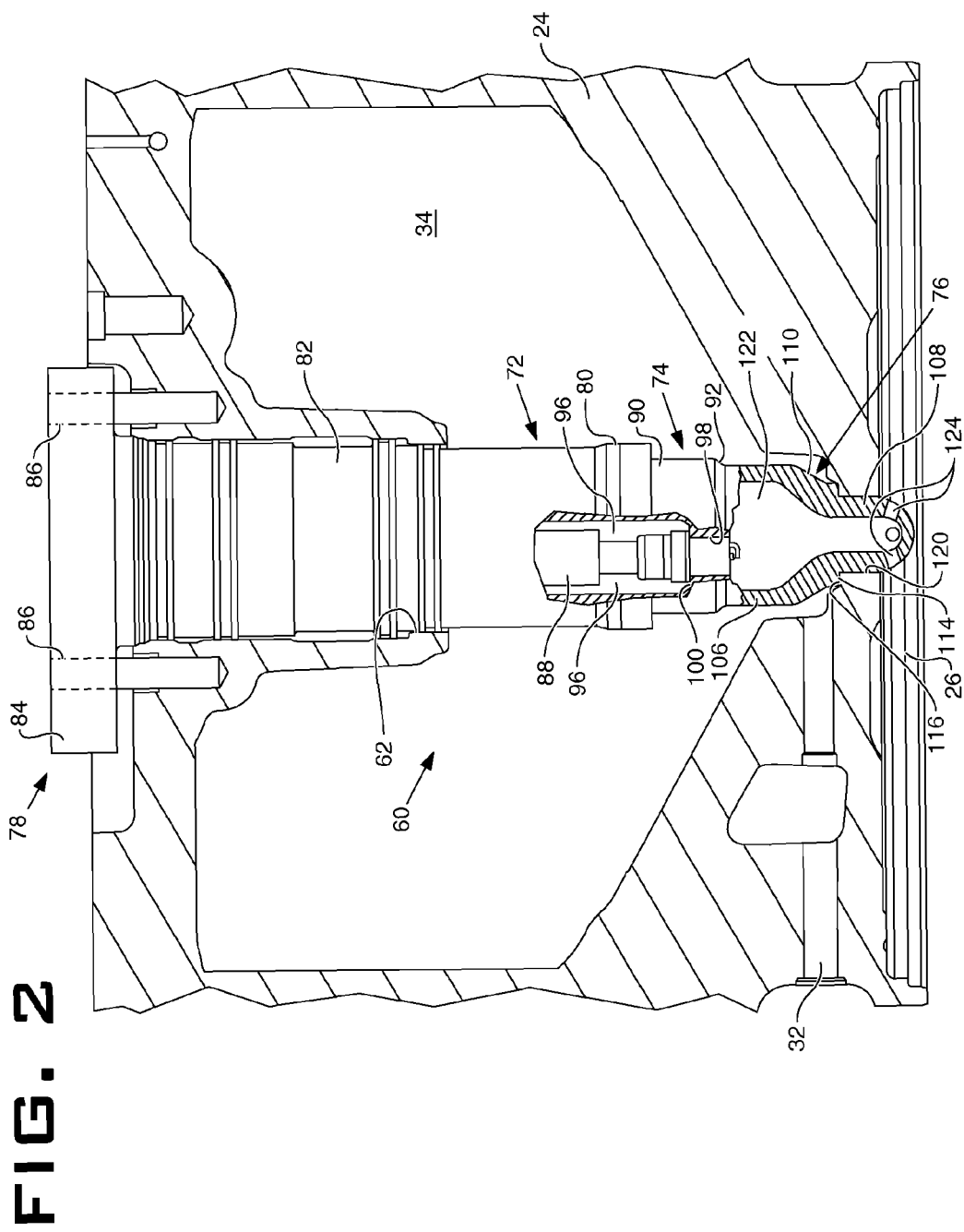
FIG. 2 is a diagrammatic cross-sectional view of the pre-combustion chamber assembly of FIG. 1 shown in greater detail.
Figure 3:
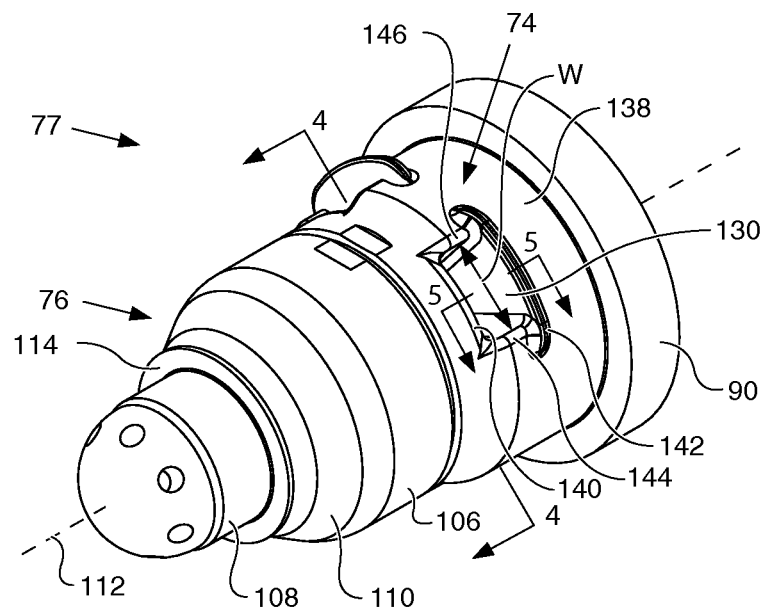
FIG. 3 is an isometric view of the tip of the pre-combustion chamber assembly of FIG. 1

With reference to FIG. 2, the pre-combustion chamber assembly 60 is shown disposed in a bore 62 in the cylinder head 24. The pre-combustion chamber assembly 60 extends from the cylinder head 24 into the main combustion chamber 26. In the depicted embodiment, the pre-combustion chamber assembly 60 has a first body portion 72, a second body portion 74 and a third body portion 76, attached in series. The second body portion 74 and third body portion 76 define a pre-combustion chamber tip 77 (FIG. 3). In other embodiments, the pre-combustion chamber assembly 60 may be formed by more or less than three body portions. For example, the pre-combustion chamber assembly may be formed as a single integrated unit with each body portion referring to a part of the single unit.

The first body portion 72 is generally cylindrical and has first end 78 and a second end 80. A flange 84 is provided at the first end 78 of the first body portion 72. The flange 84 has a pair of apertures 86 disposed therethrough for receiving fasteners (not shown) that couple the pre-combustion chamber assembly 60 to the cylinder head 24 and prevent rotary and axial movement relative to the bore 62. The first body portion 72 may be made from any suitable material. For example, the first body portion 72 may be made of a ductile iron casting—pearlitic ferritic.

The first body portion 72 is configured to mount a spark plug 88 therein such that the end of the spark plug 88 extends out of the second end 80. The spark plug 88 in the context of this invention means any suitable ignition device available in the art.

The second body portion 74 is generally cylindrical and has a first end 90 and a second end 92. The first end 90 is connectable to the second end 80 of the first body portion 72 by any suitable means, such as a brazing or welding, for example. The second body portion 74 may be made from any suitable material. For example, the second body portion 74 may be made of a stainless steel material capable of withstanding relatively high temperatures, such as wrought stainless steel alloy, Type 347. The second body portion 74 is preferably cast to the general configuration and subsequently machined to final dimensions where required.

The second body portion 74 has a stepped bore 96 that extends through the second body portion. The stepped bore 96 opens at the first and second ends 90, 92 and is adapted to receive the spark plug 88 extending from the first body portion 72. The stepped bore 96 has a spark plug mounting bore 98 adapted to receive the end of the spark plug 88. The spark plug mounting bore 98 may be threads adapted to mate with threads on the end of the spark plug 88. The stepped bore 96 defines a sealing surface 100 that is adapted to sealing engage the spark plug 88.

The third body portion 76 has a first end 106 connected to a second end 108 by a transition portion 110. The first end 106 is cylindrical, the second end 108 is a generally cylindrical spherical dome and the transition portion 110 provides a gradual transition and blending between the different diameters of the first end and second end 106, 108. The first end 106, the second end 108 and the transition portion 110 are disposed about a central axis 112.

A sealing surface 114 is disposed about the third body portion 76 at a predetermined location axially along the transition portion 110. The sealing surface 114 extends transversely relative to the central axis 112 and is provided to seal against a sealing surface 116 provided in the cylinder head 24 to prevent leakage between the main combustion chamber 26 and the first and second cooling fluid passages 32, 34.

The sealing surface 114 engages the sealing surface 116 located adjacent a bore 120 disposed in the cylinder head 24. The bore 120 opens into the main combustion chamber 26 and receives the second end 108 of the third body portion 76. The bore 120 enables the second end 108 to extend into and be exposed to the main combustion chamber 26.

The third body portion 76 has a pre-combustion chamber 122 disposed therein. The pre-combustion chamber 122 generally has the same shape as that of the third body portion 76 and opens at the first end 106 of the third body portion 76 to receive the electrode end of the spark plug 88. The second end 108 of the third body portion 76 includes a plurality of spaced apart, radially oriented orifices 124. The orifices 124 open into the pre-combustion chamber 122 and into the main combustion chamber 26. The orifices 124 direct the expanding gases from the pre-combustion chamber 122 in a predetermined pattern into the main combustion chamber 26.

The third body portion 76 is made from a high temperature material. For example, a high temperature, thermally stable and environmentally resistant alloy, such as, a nickel-chromium-tungsten-molybdenum alloy is suitable. It is to be understood that other high temperature materials of suitable composition may be substituted without departing from the invention. The third body portion 76 may be cast or machined from bar stock.

The first body portion 72, the second body portion 74 and the third body portion 76 are connected together to form the pre-combustion chamber assembly 60. In particular, the second end 80 of the first body portion 72 is connected to the first end 90 of the second body portion 74 and the second end 92 of the second body portion 74 is connected to the first end 106 of the third body portion 76.

The first body portion 72 may be connected to the second body portion 74 by any suitable means. For example, first body portion 72 may be connected to the second body portion 74 by a brazing material of a suitable composition capable of withstanding the environment (temperature, chemical and mechanical loading) in which it is exposed. A silver-nickel braze material may be suitable for such an application.

Likewise, the second body portion 74 may be connected to the third body portion 76 by any suitable means. For example, a controlled depth penetration weld, such as, a laser or electron beam weld, may be used to connect the second body portion 74 to the third body portion 76.

Figure 4:
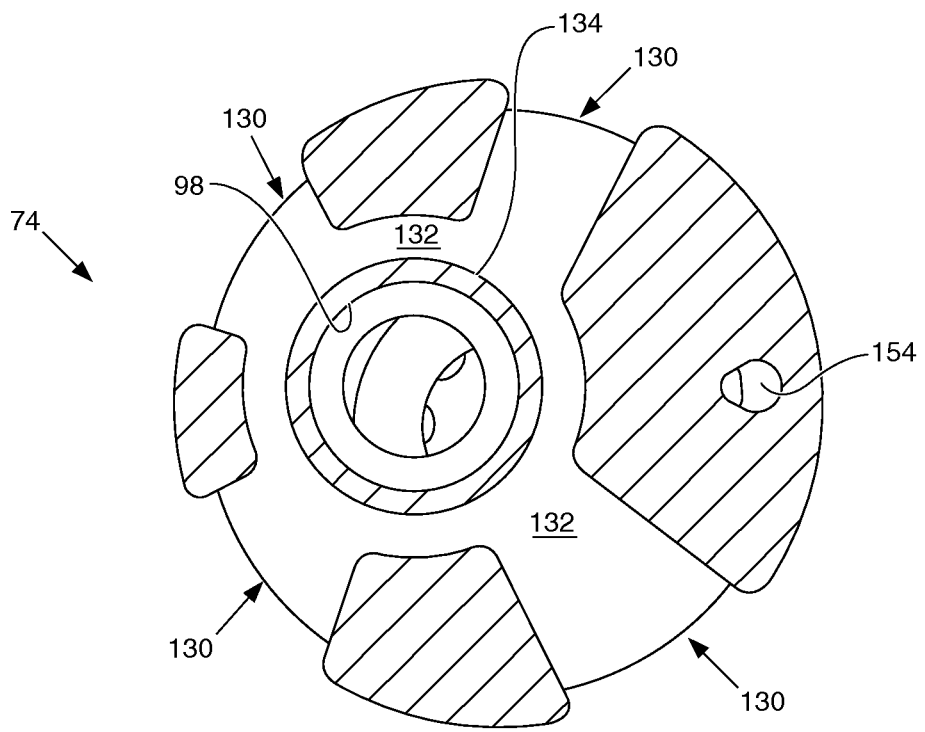
FIG. 4 is a diagrammatic cross-sectional view taken along lines 4-4 of FIG. 3.
Figure 5:
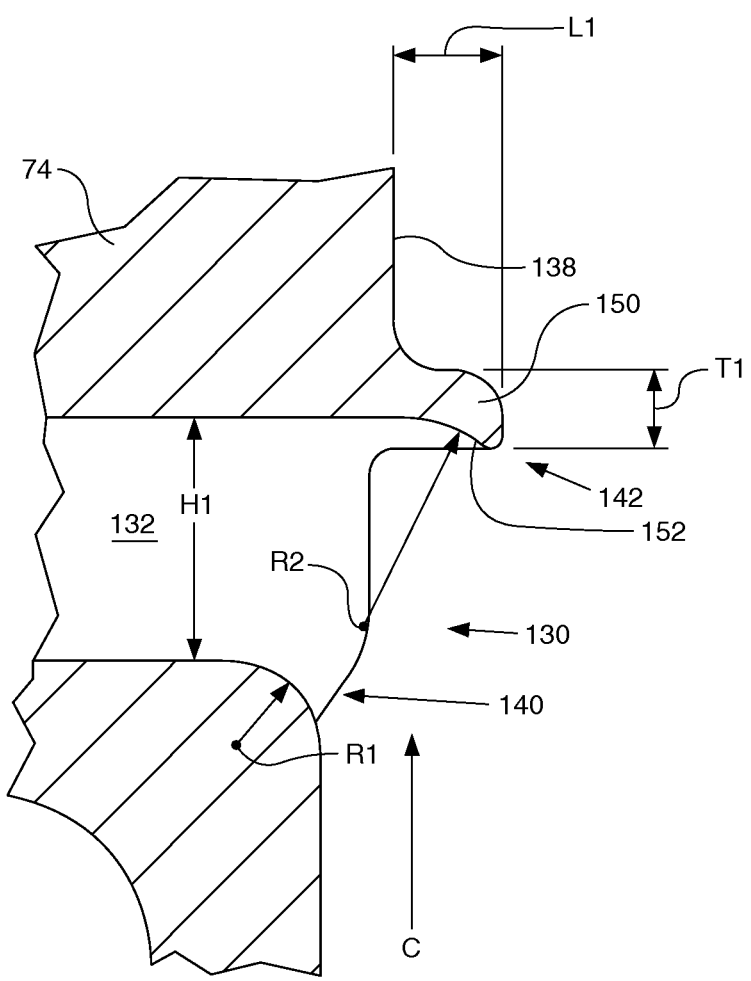
FIG. 5 is a partial diagrammatic cross-sectional view taken along lines 5-5 of FIG. 3.

As best seen in FIGS. 3-5, the second body portion 74 includes one or more cooling fluid openings 130 that lead to one or more cooling fluid passages 132 disposed in the second body portion 74 at a predetermined radial location spaced from and about the spark plug mounting bore portion 98. The second body portion 74 is disposed in the cylinder head 24 in such a way that the cooling fluid openings 130 are open to the cylinder head first cooling fluid passage 32 and receive cooling fluid from the first cooling fluid passage 32. The cooling fluid openings 130 and cooling fluid passages 132 may be configured in a variety of ways. Any openings and passages capable of passing cooling fluid flow in close proximity to the spark plug 88 and a spark plug mounting bore portion 98 may be used.

In the depicted embodiment, the spark plug mounting bore portion 98 is defined by a cylindrical wall 134 configured to surround the spark plug 88. The second body portion 74 includes four, spaced apart cooling fluid openings 130. Each of the cooling fluid openings 130 has a width W (number of degrees the opening extends around the circumference of the second body portion). In some embodiments, each cooling fluid opening 130 may extend the same number of degrees around the around the cylindrical second body portion 74, while in other embodiments, some cooling openings may extend more degrees than other cooling openings. The cooling fluid openings 130 lead to the cooling fluid passages 132 that extend radially inward and surround the cylindrical wall 134. The cooling fluid passages 132 are adapted to pass cooling fluid through the second body portion 74. The cooling fluid openings 130 and the cooling fluid passages 132 are substantially rectangular in shape. In other embodiments, however, the number, size, and shape of the cooling fluid openings 130 and cooling fluid passages 132 may vary.

Referring to FIG. 5, the second body portion 74 has a cylindrical exterior surface 138. The one or more cooling fluid openings 130 have a height H1 and include a lower edge 140, an upper edge 142 generally parallel to the lower edge 140, a first side edge 144 generally perpendicular to the lower edge 140 and upper edge 142, and a second side edge 146 generally parallel to the first side edge 144. The lower edge 140 is configured with a relatively large radius R1 and the upper edge 142 is configured with a ridge 150 that extends from the exterior surface 138 a length L1. The relatively large radius on the lower edge 140 and the ridge 150 on the upper edge 142 help facilitate the flow of cooling fluid into the cooling fluid opening 130. The ridge 150 has a thickness T1 and a concave, curved lower surface 152 with a radius R2. The ridge 150 may be substantially parallel to the lower edge 140 and extend beyond the first side edge 144 and the second side edge 146, as shown in FIG. 3.

The number, configuration and placement of the ridge 150, however, may vary. For example, in some embodiments, there may be a ridge 150 associated with every cooling fluid opening 130, while in other embodiments, a ridge 150 may be associated with only a select number of cooling fluid openings 130, such as for example, having ridges associated with inlet openings while not having ridges associated with outlet openings. In the depicted embodiment, a ridge 150 is associated with two of the four cooling fluid openings 130 while the other two cooling fluid openings 130 do not have ridges associated with them.

In addition, while in the depicted embodiment, the ridge 150 is formed adjacent the cooling fluid opening 130 on the upper edge 142, in other embodiments the ridge 150 may be formed at another location along the exterior surface 138. Any location that directs the flow of cooling fluid into the cooling fluid opening 130 may be used. Furthermore, while in the depicted embodiment, each ridge 150 is a continuous projection that is substantially parallel to the lower edge 140 and extends from a point outside of the first side edge 144 to a point outside of the second side edge 146, in other embodiments, the ridge 150 may be discontinuous across the cooling fluid opening 130, may not extend beyond the side edges 144, 146, or may not be parallel to the lower edge 140. Still further, while in the depicted embodiment, the ridge 150 includes a lower concave, curved surface 152, in other embodiments, the lower surface 152 need not be curved or concave.

One embodiment of the second body portion 74 may have a ridge 150 with different thickness T1 and a different length L1 than another embodiment of the second body portion. The second body portion 74, however, may experience large and rapid temperature fluctuations. A ridge 150 with a thickness that is too thin may crack and failure as a result of the thermal stresses/cycling and pressure from the flow of cooling fluid. Therefore, the ridge 150 must have a sufficient thickness T1 to resist cracking and failure. In addition, since the pre-combustion chamber tip assembly 60 is mounted in the cylinder head 24, the length L1 of the ridge 150 must not extend to where it would interfere with the cylinder head 24 and prevent proper installation. In the depicted embodiment, the ridge 150 does not extend radially beyond the first end 90 of the second body portion 74.

In one embodiment, the height H1 of the cooling fluid opening 130 is in the range of about 8 millimeters to about 12 millimeters, the width W of the cooling fluid opening 130 is in the range of about 34 degrees to about 42 degrees around circumference of the second body portion 74), the lower edge radius R1 is in the range of about 4 millimeters to about 8 millimeters, the ridge 150 has a length L1 in the range of about 4 millimeters to about 8 millimeters, the ridge 150 has a thickness T1 in the range of about 2 millimeters to about 6 millimeters, and the lower surface 152 has a radius in the range of about 3 millimeters to about 7 millimeters. The ridge 150 may extend in the range of about 5 degrees to about 15 degrees beyond the first and second side edges 144, 146.

In another embodiment, the height H1 of the cooling fluid opening 130 is about 10 millimeters, the width W of the cooling fluid opening 130 is about 38 degrees, the lower edge radius R1 is about 6 millimeters, the ridge 150 has a length L1 of about 6 and a thickness T1 of about 4 millimeters, and the lower surface radius R2 is about 5 millimeters.

The second body portion 74 also includes a fuel passageway 154 (FIG. 4). The fuel passageway 154 opens into the pre-combustion chamber 122 and is configured to pass fuel, such as gaseous fuel, from a fuel source (not shown), into the pre-combustion chamber 122.

INDUSTRIAL APPLICABILITY

With reference to the drawings, and in operation, the pre-combustion chamber assembly 60 is installed in the cylinder head 24. When installed, the pre-combustion chamber tip 77 is adjacent the first cooling fluid passage 32. Cooling fluid flow from the first cooling fluid passage 32 flows around the pre-combustion chamber tip 77 and upward into the second cooling fluid passage 34 (upward cooling fluid flow shown as arrow C in FIG. 5). As the cooling fluid flows upward toward the second cooling fluid passage 34, the ridges 150 associated with the cooling fluid openings 130 divert some of the cooling fluid flow into the cooling fluid openings 130 and cooling fluid passages 132. In addition, the relatively large radius R1 of the lower edge 140 of the cooling fluid openings 130 provide a relatively low flow resistance path for the diverted cooling fluid. Thus, the pre-combustion chamber tip 77 includes structural elements that facilitate the flow of cooling fluid through the cooling fluid passages 132 in the tip.

The cooling fluid flowing in the cooling fluid passages 32, 34 of the cylinder head 24 and through the cooling fluid passages 132 in the second body portion 74 facilitates cooling of the pre-combustion chamber tip 77 by transferring heat from the pre-combustion chamber assembly 60 by way of conduction. In particular, the cooling fluid cools the second body portion 74 at a location in close proximity to the spark plug 88 and the spark plug mounting bore portion 98. Thus, the temperature of the spark plug 88 at the electrode end portion of the spark plug 88 is reduced resulting in increased sparkplug life and reduced engine down time. Furthermore, the cooling of the pre-combustion chamber tip 77, which the second body portion 74 is a part of, extends the life of the second and third body portions 74, 76.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A pre-combustion chamber tip for an internal combustion engine, comprising:
    a first body portion having a pre-combustion chamber located within, the first body portion having a terminal end with a plurality of orifices configured to direct expanding gases out of the pre-combustion chamber; and
    a second body portion attached to the first body portion, the second body portion having an exterior surface, a cooling fluid opening formed in the exterior surface, a cooling fluid passage in fluid communication with the cooling fluid opening, and a ridge associated with the cooling fluid opening, the ridge extending outward from the exterior surface and forming an upper edge of the cooling fluid opening, the ridge being configured to divert cooling fluid flow into the cooling fluid opening and cooling fluid passage.

2. The pre-combustion chamber tip according to claim 1 wherein the ridge includes a concave, curved lower surface.

3. The pre-combustion chamber tip according to claim 2 wherein the concave, curved lower surface has a radius in the range of about 3 millimeters to about 7 millimeters.

4. The pre-combustion chamber tip according to claim 1 wherein the ridge has a thickness in the range of about 2 millimeters to about 6 millimeters and a radial length in the range of about 4 millimeters to about 8 millimeters.

5. The pre-combustion chamber tip according to claim 1 wherein the cooling fluid opening has a first side edge and a second side edge, and wherein the ridge extends continuously from outside the first side edge to outside the second side edge.

6. The pre-combustion chamber tip according to claim 1 wherein the cooling fluid opening has a lower edge with a radius in the range of about 4 millimeters to about 8 millimeters.

7. The pre-combustion chamber tip according to claim 1 wherein the exterior surface of the second body portion is generally cylindrical and includes four, spaced apart cooling fluid openings and four ridges, each ridge associated with a corresponding cooling fluid opening.

8. The pre-combustion chamber tip according to claim 1 wherein the second body portion has a spark plug mounting bore configured to mount a spark plug, and wherein the cooling passage is adapted to pass cooling fluid flow in close proximity to the spark plug mounting bore.

9. The pre-combustion chamber tip according to claim 1 wherein said first and second body portions are each constructed of a different metallic material.

10. An internal combustion engine, comprising:
    an engine block having at least one cylinder;
    a cylinder head engaged with the engine block to cover the cylinder and define a main combustion chamber, the cylinder head having a cylinder head cooling fluid passage;
    a pre-combustion chamber assembly mounted in the cylinder head, the pre-combustion chamber assembly, comprising:
        a first body portion having a pre-combustion chamber located within, the first body portion having a terminal end extending into the main combustion chamber and including a plurality of orifices configured to direct expanding gases from pre-combustion chamber into the main combustion chamber; and
        a second body portion attached to the first body portion, the second body portion having an exterior surface, a cooling fluid opening formed in the exterior surface, a cooling fluid passage in fluid communication with the cooling fluid opening, and a ridge associated with the cooling fluid opening, the ridge extending outward from the exterior surface and forming an upper edge of the cooling fluid opening, the ridge being configured to divert cooling fluid flow from the cylinder head cooling fluid passage into the cooling fluid opening and cooling fluid passage.

11. The internal combustion engine according to claim 10 wherein the ridge includes a concave, curved lower surface.

12. The internal combustion engine according to claim 11 wherein the concave, curved lower surface has a radius in the range of about 3 millimeters to about 7 millimeters.

13. The internal combustion engine according to claim 10 wherein the ridge has a thickness in the range of about 2 millimeters to about 6 millimeters and a radial length in the range of about 4 millimeters to about 8 millimeters.

14. The internal combustion engine according to claim 10 wherein the cooling fluid opening has a first side edge and a second side edge, and wherein the ridge extends continuously from outside the first side edge to outside the second side edge.

15. The internal combustion engine according to claim 10 wherein the cooling fluid opening has a lower edge with a radius in the range of about 4 millimeters to about 8 millimeters.

16. The internal combustion engine according to claim 10 wherein the exterior surface of the second body portion is generally cylindrical and includes four, spaced apart cooling fluid openings and four ridges, each ridge associated with a corresponding cooling fluid opening.

17. The internal combustion engine according to claim 10 wherein the second body portion has a spark plug mounting bore configured to mount a spark plug, and wherein the cooling passage is adapted to pass cooling fluid flow in close proximity to the spark plug mounting bore.

* * * * *